United States Patent [19]

Letts, III

[11] Patent Number: 5,647,708

[45] Date of Patent: Jul. 15, 1997

[54] SYSTEM FOR PROTECTING GOODS DURING TRANSPORT

[75] Inventor: James C. Letts, III, Appleton, Wis.

[73] Assignee: Hayes Manufacturing Group Inc., Neenah, Wis.

[21] Appl. No.: 501,402

[22] Filed: Jul. 12, 1995

[51] Int. Cl.⁶ .................................................. B61D 45/00
[52] U.S. Cl. ........................... 410/47; 410/119; 410/125; 410/154; 206/522
[58] Field of Search ........................ 410/47, 31, 36, 410/117, 118, 119, 125, 154, 153, 156; 206/522, 523, 395

[56] References Cited

U.S. PATENT DOCUMENTS

| | | | |
|---|---|---|---|
| Re. 22,507 | 6/1944 | Heigis | 211/75 |
| 2,620,748 | 12/1952 | Shields | 105/366 |
| 3,145,853 | 8/1964 | Langenberg | 214/10.5 |
| 4,572,716 | 2/1986 | West | 410/36 |
| 4,591,519 | 5/1986 | Liebel | 428/35 |
| 4,854,792 | 8/1989 | Cottone | 410/118 |
| 5,132,156 | 7/1992 | Trassare, Jr. et al. | 410/154 |
| 5,213,867 | 5/1993 | Huston, Sr. et al. | 428/126 |
| 5,259,524 | 11/1993 | Eckert | 220/23.4 |
| 5,409,755 | 4/1995 | Lo Presti et al. | 410/154 |

FOREIGN PATENT DOCUMENTS 2835219  2/1980  Germany.

*Primary Examiner*—Karen B. Merritt
*Assistant Examiner*—Gregory A. Morse
*Attorney, Agent, or Firm*—Thomas D. Wilhelm; Brian R. Tumm

[57] ABSTRACT

This invention pertains to bracing systems for bracing especially massive objects while the objects are being shipped, typically in a rail car. The invention is directed to packing arrangements where first and second end arrays of rolls of product are disposed in first and second ends of the rail car, with sets of rolls proximate but spaced from each other at the central doorway. Each pair of side-by-side rolls in a set includes a cavity therebetween, facing the opposing set. Wedges are placed in the cavities such that each set of rolls, with wedges in the cavities, presents a generally planar composite surface between the rolls at the loci of closest approach to the opposing rolls. Thus, with the wedges in place, the rolls, in combination, present two generally planar, typically parallel, and more-or-less continuous composite surfaces facing each other across the space separating the two sets of rolls. An air bag is inflated between the two surfaces, with the wedges preventing the air bag from bulging into the cavities. In some embodiments, contour buffer pads are placed between the air bag and the two pairs of rolls, with each contour buffer pad extending across the faces of the rolls in each set, and engaging faces of the rolls and the wedges on sides of the rolls generally opposed to each other.

42 Claims, 5 Drawing Sheets

SYSTEM FOR PROTECTING GOODS DURING TRANSPORT

FIELD OF THE INVENTION

This invention relates to devices and methods for absorbing mechanical shock such as in a transport vehicle (e.g. a railroad car), and particularly to devices and methods for generally fixing and/or controlling the relative positions of rolls of web material during transport.

BACKGROUND OF THE INVENTION

When heavy objects are shipped in transport vehicles, the responsible parties may be liable for shipping damage incurred while the objects are in transit. Rail shipments are subjected to a known level of routine shocks such as during humping of rail cars wherein a car is accelerated to a minimum speed in order to effect joining, and locking, of cars together as trains are built at the railroad switchyard. Thus, any plan for loading and/or packing of items into the rail car must provide satisfactory shock absorbing dunnage material, in a satisfactory loading arrangement, to protect the items from being damaged by routine operation of the railroad such as humping.

Parent rolls of paper web, as produced on a papermaking machine, are large and heavy. Such rolls typically weigh over 1000 pounds, and may weigh as much as several thousand pounds.

For shipping, these massive rolls are placed on end, with the transverse direction of the web material disposed vertically, such that the outer layer of paper in each roll comprises a cylindrically defined upstanding wall thereabout.

For rail shipment, the rolls are generally arranged in two arrays disposed generally on opposite ends of the rail car. The rolls in each array are generally in abutting engagement with each other, and with respective walls of the rail car, with conventional dunnage and other bracing members between ones of the rolls and between rolls and walls of the rail car, as needed to cushion the rolls, and to bring a first set of rolls in the first array into proximate but spaced and facing relationship with a second set of rolls in the second array at the doorway, which is centrally located in the rail car.

Such arrays are well known and conventionally used. In such conventional use, each array is generally firmly embraced by the combination of the respective sidewalls and the end wall of the rail car, and the conventional cushioning dunnage elements used between individual rolls and between ones of the rolls and the side and end walls of the rail car.

Given the above, the rolls in each array are fixedly secured, with respect to the corresponding side walls and end wall on the respective end of the car, against movement inside the rail car in response to impact shocks imparted to the rail car during normal transport. However, the space between the first and second sets of rolls at the doorway needs to be filled with dunnage to control movement of the first and second sets of rolls at the doorway, and to unitize/tie the two arrays to each other to thereby effectively combine all the rolls in the rail car into a single overall array. Such control of the first and second sets of rolls is, further, imperative to maintaining the unity of each of the arrays, such that individual ones of the rolls are unable to react individually to shipping shocks.

Thus, in an ideal transport situation, the combination of all the rolls in the rail car acts as a single unit. To the extent the arrays can be linked to each other through proper use of dunnage, the two arrays, in combination, act as a single unit. To the extent the two arrays act as a single unit and the end arrays are immovably embraced by the side and end walls of the rail car, significant movement of the rolls relative to each other and relative to the walls of the rail car, is prevented. To the extent movement of the rolls can be controlled, shipping damage is correspondingly controlled.

It is known to fixedly secure a bracing system to the floor of the rail car. However, parent rolls of paper are manufactured in a variety of sizes, which require a variety of packing patterns in the rail car, and thus a relatively versatile bracing system at the doorway. Accordingly, fixedly securing a bracing system to the floor of the rail car is inefficient for such application.

It is known to use inflatable air bags between facing rolls. In such use, after the rolls are in place, the bag is positioned between the rolls and then inflated to about 8–10 pounds per square inch gauge (psig) pressure. In one such use, a single bag is positioned vertically with respect to each set of facing rolls as shown in Prior Art FIG. 1.

In a second such use, the bag is laid down horizontally, filling the space between all the facing rolls, and is then inflated as shown in Prior Art FIG. 2. If the paper rolls of the load extend above the horizontally-disposed bag, a second bag may be placed and inflated above the first bag.

In either case of the above prior art assemblages, the surfaces of the bag, as inflated, tend to follow the contours of the respective adjacent rolls. When force is exerted on the outside of the bag by e.g. a shock, the bag distributes the force partially against the adjacent rolls, but in significant amount by expanding the enlarged, bulging ends of the bag. In the case of FIG. 2, the bag also expands/bulges at its central portion as shown, into the respective cavities between adjacent ones of the rolls. To the extent the bag can disperse the shock by further expansion or bulging of the bag, the bag may not effectively resist movement of the roll. Thus, movement of the roll is not effectively controlled. The bag and the rolls shift. Damage to both the rolls and the bag can result. To the extent the bag is damaged, of course, the bag fails in its primary role of cushioning the rolls.

It is known in e.g. Cottone U.S. Pat. No. 4,854,792 to use a single contour buffer pad as a spacing device between each and every roll, in the shipment and wherein the rolls are disposed in a single straight line between opposing ends of the rail car. It is also known to use buffer pads selectively between rolls. The pad as disclosed in Cottone includes a base sheet, and embracing shoulder pads on each edge of the base sheet, wherein the shoulder pads on a given side of the base sheet are spaced to embrace a single given roll of product at two spaced loci displaced from each other about the circumference of the roll, with the central portion of the base sheet therebetween.

West U.S. Pat. No. 4,572,716 uses a bracing system comprising a pair of single-sided contour buffer pads against each of two rolls, with an inflated air bag between the two buffer pads. As in Cottone, West addresses each two facing rolls separately, and does not address the issue of how to link together, and thereby to stabilize, and generally to immobilize the two pairs of rolls at the doorway of the rail car. As in Cottone, the West buffer pads address only a loading pattern wherein the rolls are aligned in straight lines between opposing ends of the rail car.

The teachings of known references are limited to cushioning rolls aligned in straight lines between ends of the rail car. But the diameters of the rolls may not accommodate an efficient straight-line loading pattern in the rail car. For example, it is now common to ship paper rolls 42-55 inches in diameter. Given the typical width of the rail car of e.g. 114-116 inches, efficient loading of such rolls suggests using offset loading patterns. Offset loading patterns transfer longitudinally-imposed shocks on the car into transversely directed forces acting on and through the rolls. Accordingly, cushioning dunnage material should provide for, and thus control, such transverse forces in the load. It is especially important that no transverse force be imposed on the door of the rail car.

This invention is directed toward providing improvements in devices and methods for stabilizing, and generally immobilizing facing sets of movable massive objects in a rail car such that all the units act as a single array, generally by linking the respective massive objects together using linking bracing members, and improving the effectiveness of an associated air bag in transferring shock within the so-built single array.

Thus it is an object of the invention to provide a dunnage wedge to be placed in the cavity between first and second rolls of a side-by-side pair of rolls, and thereby to impede bulging of the air bag into the cavity.

It is another object to provide a bracing system between first and second facing pairs of rolls, including a first wedge in the first cavity, a second wedge in the second cavity, and an inflatable bag disposed between the two pairs of rolls, inflated against the respective ones of the rolls and the wedges.

It is still another object to provide a bracing system wherein the inflatable bag has a generally uniform thickness across the faces of the two pairs of rolls, and generally is precluded from entering the respective cavities between the rolls.

SUMMARY OF THE DISCLOSURE

Some of the objects are obtained in a first family of embodiments comprehending a cushioning dunnage wedge precursor having a length, a width, opposing first and second sides, opposing first and second outer surfaces extending along the length and width, the cushioning dunnage wedge precursor comprising a central panel defined between the first and second sides, the central panel having first and second edge surfaces at corresponding first and second edges of the central panel and extending from the first outer surface toward the second outer surface, and first and second wing panels on opposing sides of the central panel, whereby each of the first and second outer surfaces comprises a central element and first and second wing elements, the first and second wing panels having third and fourth edge surfaces in facing relationship with respective ones of the first and second edge surfaces, the wing panels depending from the central panel and being adapted to pivot with respect to the central panel at the first and second edge surfaces to bring the first and second wing elements of the second outer surface into facing relationship with the central element of the second outer surface, to thereby form a wedge having a first wedge surface comprising the central element of the first outer surface and a second wedge surface comprising, in combination, the first and second wing elements of the first outer surface.

Preferably, the first and second wedge surfaces are planar, and are parallel with each other when the wing panels are pivoted to bring the first and second wing elements of the second outer surface into facing relationship with the central element of the second outer surface.

It is preferred that the second outer layers in the wing panels comprise functional extensions of the second outer layer of the central panel whereby the central panel and the first and second wing panels share the second outer layer in common.

In preferred embodiments, the first and second wing panels depend from the central panel through respective first and second bridging members of the second outer layer at respective ones of the first and second edge surfaces.

The central panel typically has a length extending across the width of the cushioning dunnage wedge precursor, and each of the first and second edge surfaces extend from the first outer surface of the central panel through the cushioning dunnage wedge precursor, toward the second outer surface at an angle of about 20 to about 65 degrees, preferably about 35 to about 55 degrees, more preferably about 40 to about 50 degrees, most preferably about 45 degrees, from the first outer surface of the central element, and terminating at a locus displaced from the second outer surface.

In preferred structures, the first and second edge surfaces diverge from each other in a direction from the first outer surface toward the second outer surface.

Further to preferred structures, the central panel and each of the first and second wing elements have widths extending along the length of the cushioning dunnage wedge precursor at each of the first and second outer surfaces, the sum of the widths of the wing panels at the second outer surface preferably approximating, but being no greater than, the width of the central panel at the second outer surface.

In preferred embodiments, each of the central panel and the first and second wing panels includes first and second opposing outer layers, and a core layer between the first and second outer layers.

In preferred cushioning dunnage wedge precursors of the invention, in each of the central panel and the wing panels, the first and second outer layers comprise about 33 to about 48 pound per 1000 square foot ream paper, and the core layer comprises a paper medium configured as a honeycomb construction having cells about 0.38 to about 1.0 inch across, wherein the cells extend generally between the first and second outer layers, and the paper medium is about 25 to about 38 pounds per 1000 square foot ream.

In a second family of embodiments, the invention comprehends a cushioning dunnage wedge having a length, a width, opposing first and second outer surfaces extending along the length and width, a thickness between the first and second outer surfaces, and opposing first and second edge surfaces extending along the length, the cushioning dunnage wedge comprising a first cushioning central panel extending along the length and the width, and second and third cushioning wing panels depending from the first cushioning central panel at the first and second edge surfaces respectively, each of the first and second edge surfaces being comprised of a respective edge of the first central panel and an edge of a respective wing panel, and extending from the first outer surface to the second outer surface at an angle of about 20 degrees to about 65 degrees from the first outer surface.

In preferred embodiments, each of the edge surfaces comprises edge elements disposed in a plane extending from the first outer surface to the second outer surface at the recited angle.

Preferably, the first and second outer surfaces are planar, and are parallel with each other.

It is preferred that each of the first and second edge surfaces extend from the first outer surface toward the second outer surface at an angle of about 35 to about 55 degrees, more preferably about 40 to about 50 degrees, most preferably, about 45 degrees, with the first and second edge surfaces diverging from each other in a direction from the first outer surface toward the second outer surface.

The invention further comprehends a third family of embodiments comprising a bracing system for bracing and cushioning the impact of a plurality of movable massive objects in a transport vehicle, the movable massive objects being arranged such that first and second units of the movable massive objects, comprising a first pair, are in proximate but spaced facing relationship to third and fourth units of such movable massive objects, comprising a second pair. The first and second units are disposed against and in contact with each other at first loci of contact along first and second upstanding walls thereof. The third and fourth units are disposed against and in contact with each other at second loci of contact along third and fourth upstanding walls thereof. The first, second, third, and fourth upstanding walls are generally cylindrical and have respective first, second, third, and fourth heights. In the transport vehicles wherein the invention is best utilized, the first and second units are spaced from and proximate the third and fourth units. A first imaginary plane defined by the combination of the first and second units at third loci of closest approach to the third and fourth units is substantially parallel to a second imaginary plane defined by the combination of the third and fourth units at fourth loci of closest approach to the first and second units. A first cavity, having a first depth, is defined between the first and second units and the first imaginary plane, and a second cavity having a second depth, is defined between the third and fourth units and the second imaginary plane. Given the above environment, the bracing system comprises a first wedge means in the first cavity, having a first length comprising at least 50 percent of the smallest one of the first and second heights, a first width, first and second opposing outer surfaces and a first thickness therebetween, first and second edge surfaces extending along the first length and disposed across the first width from each other, the first outer surface being disposed proximate the first imaginary plane, the second opposing outer surface being disposed inwardly in the first cavity from the first outer surface, the first and second edge surfaces engaging respective ones of the first and second units along major portions of the first length of the first wedge means; a second wedge means in the second cavity, having a second length comprising at least 50 percent of the smallest one of the third and fourth heights, a second width, third and fourth opposing outer surfaces and a second thickness therebetween, third and fourth edge surfaces extending along the second length and disposed across the second width from each other, the third outer surface being disposed proximate the second imaginary plane, the fourth opposing outer surface being disposed inwardly in the second cavity from the third outer surface, the third and fourth edge surfaces engaging respective ones of the third and fourth units along major portions of the second length of the second wedge means; and an inflatable member for being inflated and thereby having outer surfaces thereof disposed along the first and second imaginary planes between the third and fourth loci of closest approach, urging the first pair of units and the first wedge means, in combination, away from the second pair of units and the second wedge means, in combination.

Preferably, the first and second edge surfaces engage respective ones of the first and second units along substantially the entirety of the first length of the first wedge means, and the third and fourth edge surfaces engage respective ones of the third and fourth units along substantially the entirety of the second length of the second wedge means.

In preferred embodiments, the inflatable member is in surface-to-surface contact with the first and second wedge means along the first and second imaginary planes, and exerts the force of a compressed gas inside the inflatable means, thereby urging the first and second units away from the third and fourth units.

In highly preferred embodiments, the second outer surface is disposed inwardly in the first cavity from the first outer surface a distance between about 22 percent and about 50 percent of the first depth.

It is preferred that the first and second edge surfaces on the first wedge means, and the third and fourth edge surfaces on the second wedge means, be generally planar, and be adapted to progressively crush and deform against, and thereby to progressively engage, the upstanding walls of the respective first, second, third, and fourth units as forces are applied between the respective edge surfaces and the respective upstanding walls, whereby the respective edge surfaces are progressively deformed in dynamically responsive contact with the upstanding walls as forces are applied between the wedge means and the respective units.

Preferably, the bracing system comprises first and second contact shoulders, connected to each other by a connector, thereby to maintain a predetermined distance therebetween, the contact shoulders contacting the first and second units outwardly of the third and fourth loci of closest approach, and urging the first and second units toward each other.

In some embodiments, the contact shoulders comprise expanded end portions of the inflatable member expanded against respective portions of the respective upstanding walls, with the inflatable member having a generally uniform inflated thickness between the third and fourth loci of closest approach.

In some embodiments, the inflatable member has a length exceeding the distance between the third and fourth loci of closest approach, a first expanded end portion disposed against respective portions of the first and third upstanding walls at fifth and sixth loci disposed outwardly of the third and fourth loci of closest approach at the first and third units, and has a second expanded end portion disposed against respective portions of the second and fourth upstanding walls at seventh and eighth loci disposed outwardly of the third and fourth loci of closest approach at the second and fourth units, the first and second expanded end portions, in combination, urging the first and second units, and the third and fourth units, respectively, toward each other.

It is preferred that each wedge means comprise a cushioning dunnage wedge having a length, a width, opposing first and second outer surfaces extending along the length and width, a thickness between the first and second outer surfaces, and opposing edge surfaces corresponding with the edge surfaces of the respective wedge means, each cushioning dunnage wedge comprising a first cushioning central panel extending along the length and the width, and second and third cushioning wing panels depending from the first cushioning panel at the edge surfaces, the wing panels extending from the respective edge surfaces and being disposed against the first cushioning central panel, each of the first and second edge surfaces being comprised of a respective edge of the first central panel and an edge of a respective wing panel.

The bracing system may include at least one contour buffer pad disposed between the inflatable member and respective at least one of the first and second pairs of units and the respective wedge means, the contour buffer pad comprising a base member extending along the respective one of the first and second imaginary planes between respective units in the respective pair of units and outwardly of the third and fourth loci of closest approach, and first and second contact shoulders, comprising shoulder pads, mounted on the base member and contacting the respective units outwardly of the third and fourth loci of closest approach, the inflatable member urging the contour buffer pad toward the respective units whereby the first and second shoulder pads press against the respective units and urge the respective units toward each other.

In preferred bracing systems of the invention, the edge surfaces are adapted to progressively crush and deform against, and thereby to progressively engage, the upstanding walls of the respective units as forces are applied between the respective edge surfaces and the respective upstanding walls, whereby the respective edge surfaces are progressively permanently deformed in dynamically responsive contact with the upstanding walls as forces are applied between the wedge means and the respective units.

Preferably, the first and third outer surfaces of the wedge means extend generally along the respective first and second imaginary planes between the third and fourth loci of closest approach, thus presenting generally planar surface means to receive the inflatable member proximate the first and second imaginary planes, thereby to transfer forces from the inflatable member to the respective units through the first and second wedge means and respective edge surfaces.

In a fourth family of embodiments, the invention comprehends a bracing system for bracing and cushioning the impact of a plurality of movable massive objects arranged in a pattern in a transport vehicle, the pattern being configured such that first and second units of such movable massive objects, comprising a first pair, are arranged in proximate but spaced facing relationship to third and fourth units of such movable massive objects, comprising a second pair, the first and second units being disposed against, and in contact with, each other at a first locus of contact along respective first and second upstanding walls thereof, the third and fourth units being disposed against, and in contact with, each other at a second locus of contact along respective third and fourth upstanding walls thereof, a first imaginary plane, defined by the combination of the first and second units at third loci of closest approach to the third and fourth units, being substantially parallel to a second imaginary plane, defined by the combination of the third and fourth units at fourth loci of closest approach to the first and second units, a first cavity defined between the first and second units and the first imaginary plane and having a first depth, a second cavity defined between the third and fourth units and the second imaginary plane and having a second depth. Given the above environment, the bracing system comprises a first wedge means in the first cavity; a second wedge means in the second cavity; and an inflatable member having first and second sides, the inflatable member extending across and between the third and fourth loci of closest approach and urging the first wedge means inwardly of the first cavity, and urging the second wedge means inwardly of the second cavity, the inflatable member having a generally uniform thickness between the third and fourth loci of closest approach, and thereby urging the first and second units and the first wedge means, in combination, away from the third and fourth units and the second wedge means, in combination.

In some embodiments, the inflatable member has a length extending outwardly of the third and fourth loci of closest approach, first and second expanded end portions of the inflatable member extend toward, and engage, respective ones of the first, second, third, and fourth upstanding walls outwardly of the third and fourth loci of closest approach, and thereby urge the first and second units, and the third and fourth units, respectively, toward each other.

In preferred applications of the invention, the first and second pairs of units of movable massive objects are disposed at a door in the transport vehicle, the first and second pairs being included in respective first and second arrays of the movable massive objects defined between the first and second pairs and respective opposing walls of the transport vehicle, that portion of each array disposed between the respective pair of units and respective walls transferring, from the respective walls of the transport vehicle to the respective pair of units, impact forces imposed on the respective walls by movements of the transport vehicle, the bracing system being configured and adapted to transfer the impact forces between the first and second arrays while maintaining a relatively uniform thickness of the inflatable member between the first and second pairs along a path extending between first ones of the third and fourth loci of closest approach and second ones of the third and fourth loci of closest approach.

In highly protective ones of the embodiments, the bracing system may include at least one contour buffer pad between the inflatable member and respective at least one of the first and second pairs of units and the respective wedge means, the contour buffer pad comprising a base member extending along the respective one of the first and second imaginary planes and between respective units in the respective pair of units outwardly of the third and fourth loci of closest approach, and first and second shoulder pads mounted on the base member and contacting the respective units outwardly of the third and fourth loci of closest approach, the inflatable member urging the contour buffer pad toward the respective units whereby the first and second shoulder pads press against the respective units and urge the respective units toward each other.

In preferred embodiments, each of the first and second wedge means has a length comprising at least 50 percent of the smallest one of the heights of the respective units, a width, first and second opposing outer surfaces and a thickness therebetween, first and second edge surfaces extending along the length and disposed across the width from each other, the first outer surface being disposed proximate the respective imaginary plane, the second opposing outer surface being disposed inwardly in the respective cavity from the first outer surface, the first and second edge surfaces engaging respective ones of the units along major portions, preferably along substantially the entirety of the respective lengths of the first and second wedge means.

It is preferred that, for each of the first and second wedge means, the first outer surfaces extend generally along the respective first and second imaginary planes between the third and fourth loci of closest approach, thus presenting first and second generally planar surface means, along the first and second imaginary planes, to receive the inflatable member proximate the first and second imaginary planes, thereby to transfer force from the inflatable member to the respective units through the first and second wedge means and respective edge surfaces.

BRIEF DESCRIPTION OF THE DRAWINGS

FIG. 9.

Figure 1:
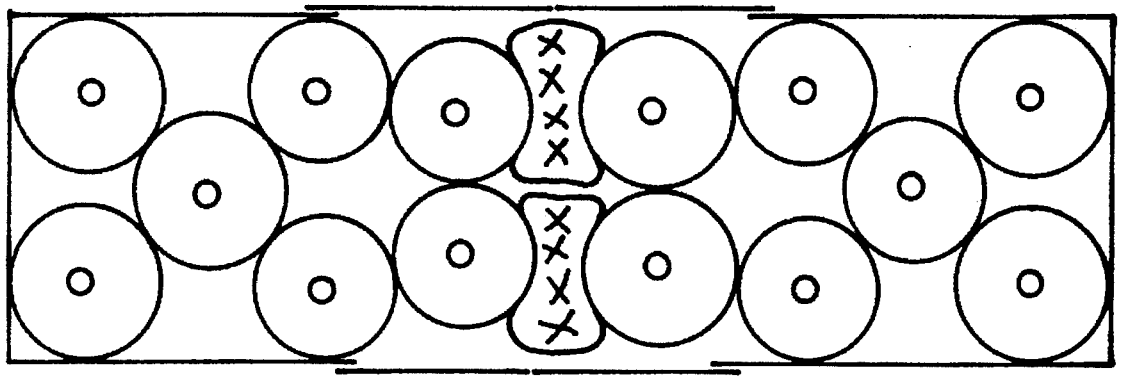
FIGS. 1 and 2 show top views of the insides of rail cars using prior art shipping bracing systems with the product.

It is to be understood that the invention is not limited in its application to details of construction or the arrangement of the components set forth in the following description and illustrated in the drawings. The invention is capable of other embodiments or of being practiced or carried out in various ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Figure 2:
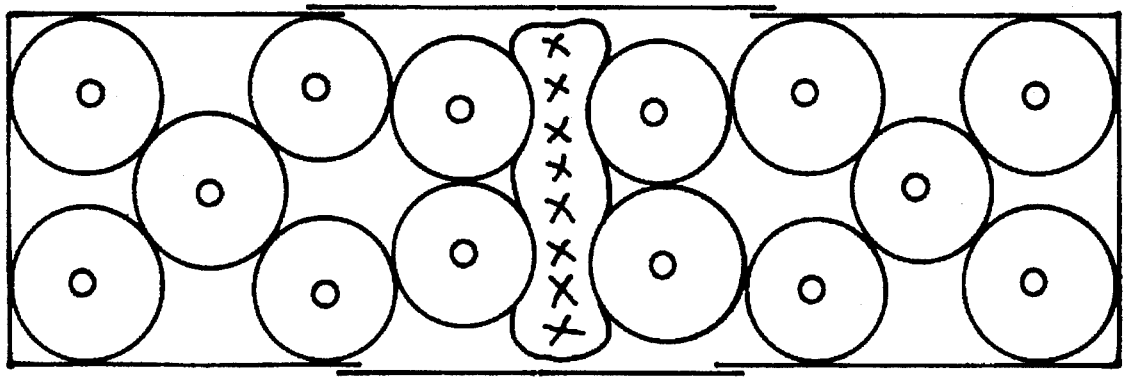

Referring now by characters of reference to the drawings, FIGS. 1 and 2 illustrate top views of the insides of rail cars employing Prior Art bracing systems. In the Prior Art as illustrated in FIGS. 1 and 2, the bracing system adjacent the rail car door consists exclusively of one or more inflatable air bags. As discussed above, West U.S. Pat. No. 4,572,716 combines cushioning chocks with an air bag, interposed between two adjacent rolls.

Figure 3:
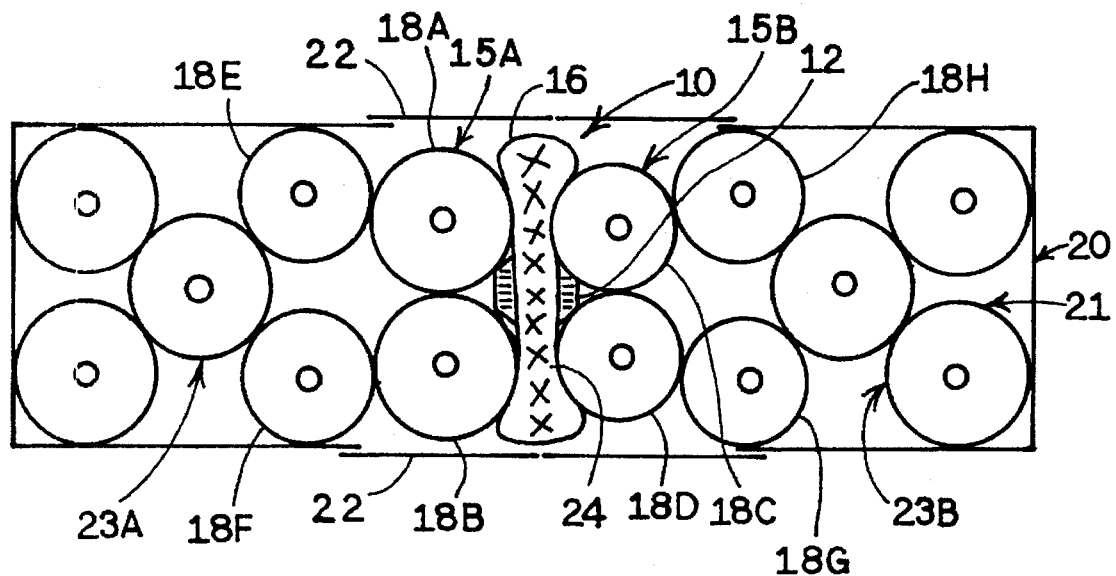
FIGS. 3 and 4 show top views of the insides of rail cars using shipping bracing systems of the invention.
Figure 4:
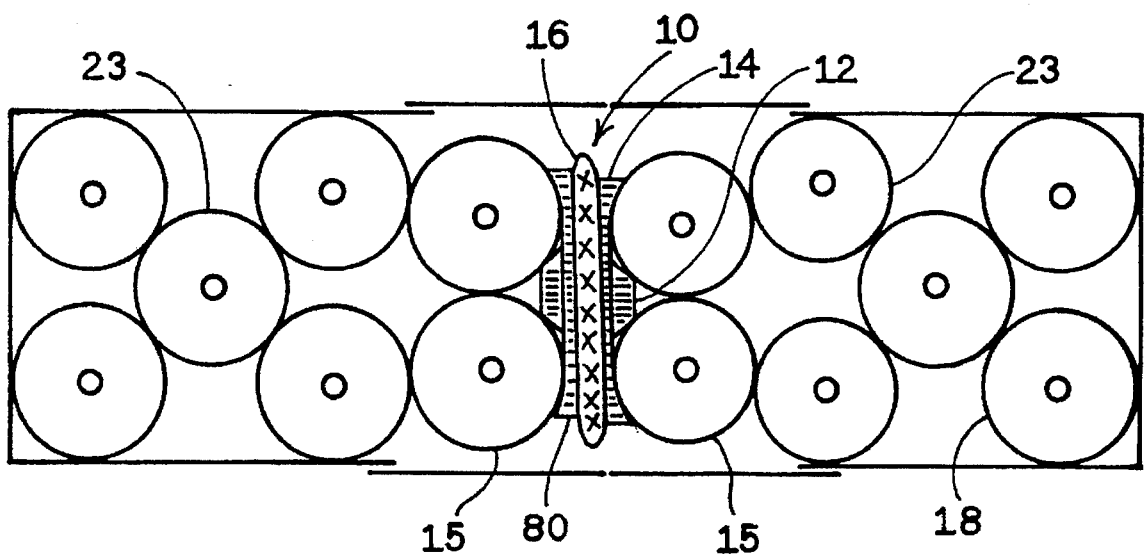

Referring now to FIGS. 3 and 4, the bracing systems 10 of the invention combine novel wedges 12, and optionally novel contour buffer pads 14, with at least one disposable air bag 16 horizontally placed, such that the combined affect of the bracing system is to substantially immobilize the two pairs 15 of rolls 18, e.g. pairs 15A and 15B, disposed closest adjacent, but spaced from, the rail car door 22.

In general, rolls of paper 18 may be loaded into a rail car 20 in a variety of known overall array patterns 21 approved by the railroads, including a variety of array elements 23 in such patterns. The preferred overall array pattern 21 for the loading of any one rail car in general depends on the size and weight of the rolls being shipped. An exemplary overall array pattern 21 is shown in FIGS. 3 and 4.

The rail car 20 is loaded through one of the doors 22 located generally centrally on the rail car on either side of the car. In loading the rail car, workers bring the rolls 18 into the car through door 22. The first rolls brought into the car are deposited at opposing ends of the car. As the loading continues, additional rolls are placed adjacent rolls already in the car, whereby the assemblage of rolls at each end of the car grows progressively closer to the central door until the car is substantially full, and contains two matched array elements; 23A, 23B, one at each end of the car.

The particular pattern in which the rolls are arranged, and thus the placement of any one roll as the roll is loaded into the car, is predetermined before the loading is begun. Thus, the load pattern, as illustrated in FIGS. 3 and 4 is known before loading of the car begins. Conventional placement of conventional dunnage is used to make minor adjustments in the load pattern as the loading progresses.

Where, as in the embodiments illustrated, the rolls, or other product being shipped, are loaded through the centrally-located door 22, the predetermined pattern typically includes two pairs of rolls proximate and spaced from, each other at the center of the car, adjacent the door, with each array element 23 including one of the pairs 15 at the door. With the two array elements 23 in place, a first pair 15A of rolls 18A and 18B in array element 23A faces a second pair of rolls 18C and 18D in array element 23B, across an intervening space 24 adjacent the door 22. In addition, four doorpost rolls 18E, 18F, 18G, and 18H are positioned against the sides of the car adjacent the doors, and receive transversely-directed forces from the first and second pairs of rolls 15A, 15B.

At that stage in the loading process, each roll in each pair defines a locus of closest approach 28 to the opposing roll in the opposing pair. Thus, roll 18A of the first pair 15A of rolls has a locus of closest approach 28A facing roll 18C of the second pair 15B at its locus of closest approach 28C. Roll 18B, also of the first pair 15A, has a locus of closest approach 28B facing roll 18D, of the second pair, at its locus of closest approach 28D.

Loci of closest approach 28A and 28B define a first imaginary plane 30 therebetween. Loci of closest approach 28C and 28D define second imaginary plane 32 therebetween. A first cavity 34 is defined between rolls 18A, 18B, and first imaginary plane 30. A second cavity 36 is defined between rolls 18C, 18D, and second imaginary plane 32.

As illustrated in the drawings, a cushioning dunnage wedge 38 is positioned within each cavity 34, 36. Thus, loci of closest approach 28A and 28B, along with an outer surface of wedge 38A, and loci of closest approach 28C and 28D, along with an outer surface of wedge 38B, define first and second generally planar, typically parallel, and generally continuous surfaces 40 facing each other across the space 24.

An inflatable air bag 16, is placed in the space 24 between the generally continuous surfaces 40 so defined, and inflated such that the air bag exerts opposing forces against each of the surfaces 40, generally urging the surfaces 40, and the respective rolls and wedges, away from each other. Thus, the air bag 16 serves as a shock absorbing, and shock transferring, buffer between the rolls and wedges.

Figure 5:
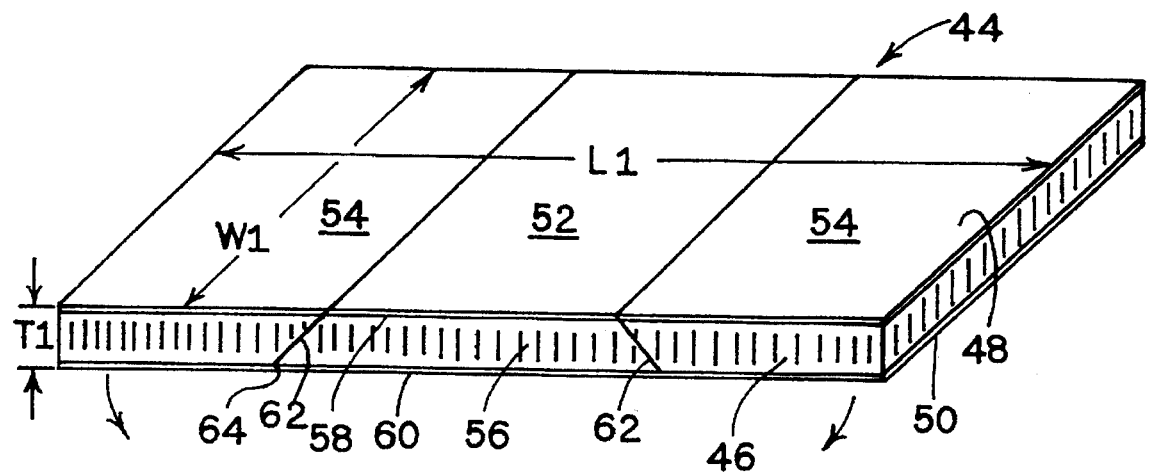
FIG. 5 is a representative pictorial view of a cushioning dunnage wedge precursor of the invention.
Figure 6:
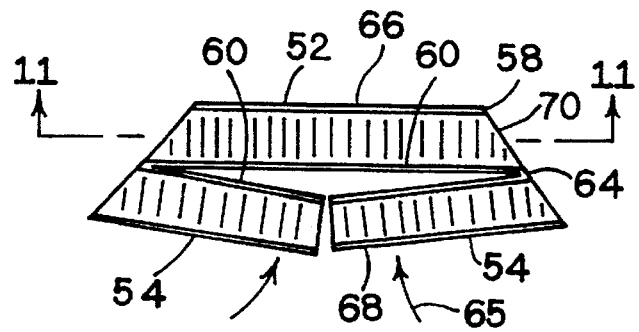
FIG. 6 is an elevation view of the precursor of FIG. 4 with the wing panels in the process of being folded onto the central panel to form the wedge.
Figure 7:
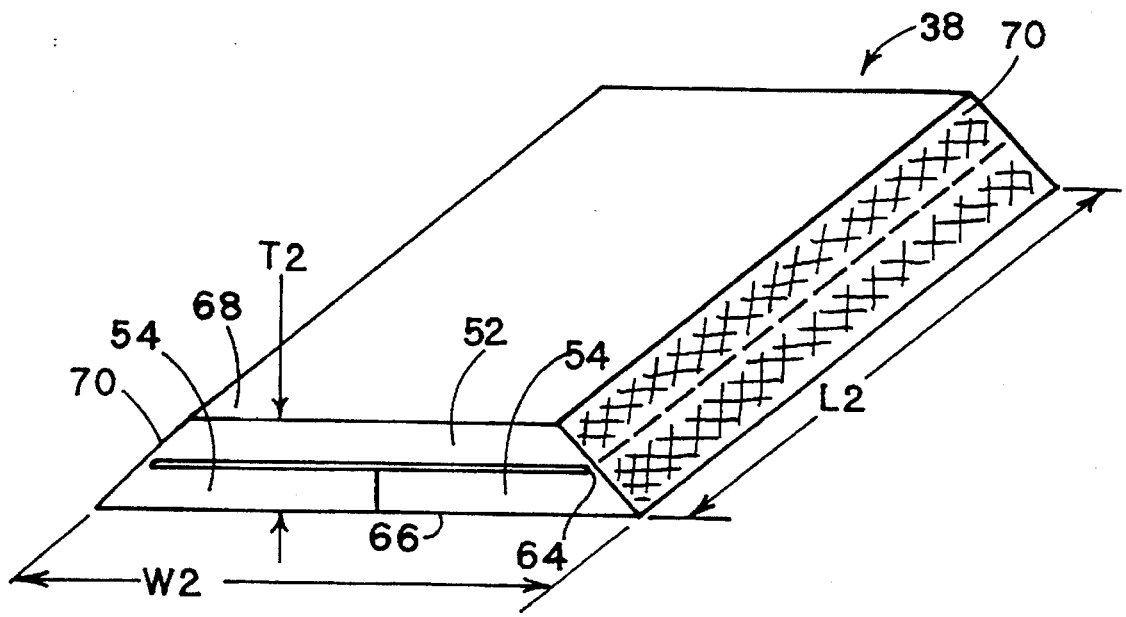
FIG. 7 shows a pictorial view of the wedge after the wing panels are folded into surface-to-surface contact with the central panel.

Referring now to FIGS. 5–7, a wedge precursor 44 has a length "L1," a width "W1," sides 46, opposing outer surfaces 48, 50, and a thickness "T1." A central panel 52 is centrally located with respect to opposing wing panels 54. The structure of wedge precursor 44 comprises a core layer 56 of generally uniform thickness. Opposing outer layers 58, 60 are secured as by adhesive to core layer 56 on its major opposing surfaces.

The core layer is preferably linerboard e.g. 25–38 pounds per 1000 square foot ream, preferably 30–35 pounds per ream, or other suitably strong paper, fabricated as a honeycomb structure, with the honeycomb cells oriented across the thickness "T1."

Figure 11:
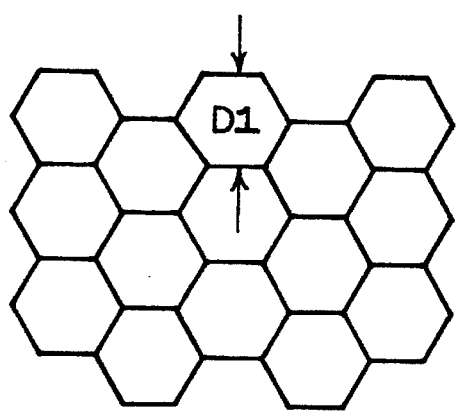
FIG. 11 is a fragmentary cross section showing the structure of the core layer of the wedge central panel, and is taken at 11—11 of FIG. 6.

The general nature of the honeycomb structure is shown in FIG. 11. Such honeycomb structure, when formed of paper is generally an array of hexagonally-shaped cells, adhesively secured to each other. Such structures are generally defined in terms of the type of paper used, the width of the adhesive lines where the paper elements are secured to each other, and the distance "D1" across the cell. Preferred distances "D1" are between about 0.375 inch and about 1 inch, with distances "D1" of up to 0.75 inch being more preferred.

The outer layers 58, 60 of the precursor 44 are also preferably paper, typically 33–48 pounds per 1000 square foot ream, preferably 40–45 pounds per ream.

Where honeycomb structures are used, the weight of the paper for the core layer and the outer layers can vary outside the above disclosed ranges so long as the resulting compressive strength is sufficient to protect the material being shipped.

As used herein, "pounds per ream," according to a conventional definition, refers to the weight in pounds of a 1000 square foot section of the (paper) web material being discussed.

Severance surfaces 62 extend across the width "W1," through the first outer layer 58, and through the core layer 56, but generally terminating at the second outer layer 60 without substantially penetrating the second outer layer. The severance surfaces 62 generally lie within planes extending from the first outer layer 58 toward the second outer layer 60 at beneficial angles described below. Thus, the wing panels depend from the central panel at respective bridging members 64 of the second outer layer 60.

To form the wedge 38 from the wedge precursor 44, the wing panels 54 are rotated about the bridging members 64 as shown by arrows 65 in FIG. 6, to bring the second outer surfaces 60 of the wing panels into surface-to-surface relationship with the second outer surface 60 of the central panel. The wedge, after completion of the rotation is shown pictorially in FIG. 7.

The completed wedge 38 has a length "L2" extending across the width "W1" of the wedge precursor 44, a width "W2" extending along the length "L1" of the wedge precursor, and an overall thickness "T2," opposing first and second outer surfaces 66, 68, and opposing edge surfaces 70 extending along the length "L2" between the first and second outer surfaces 66, 68. The edge surfaces 70 are comprised of complementary, generally planar, edge surface portions provided by each of the central panel and the wing panels. As seen in the drawings, the sum of the widths of the wing panels 54, at second outer surface 60, approximates, but does not exceed, the width of the central panel 52, whereby the wing panels can both be folded against the respective outer surface 60 of the central panel at the same time.

Edge surfaces 70 are inclined at an angle of about 20 to about 65 degrees to the respective outer surfaces 66, 68 and preferably diverge from each other in a direction taken from the first outer surface 66 toward the second outer surface 68. In general, a narrower range of angles is preferred, such as about 35 to about 55 degrees, or 40 to 50 degrees, with 45 degrees being most preferred. Edge surfaces 70 are preferably planar as formed.

Figure 8:
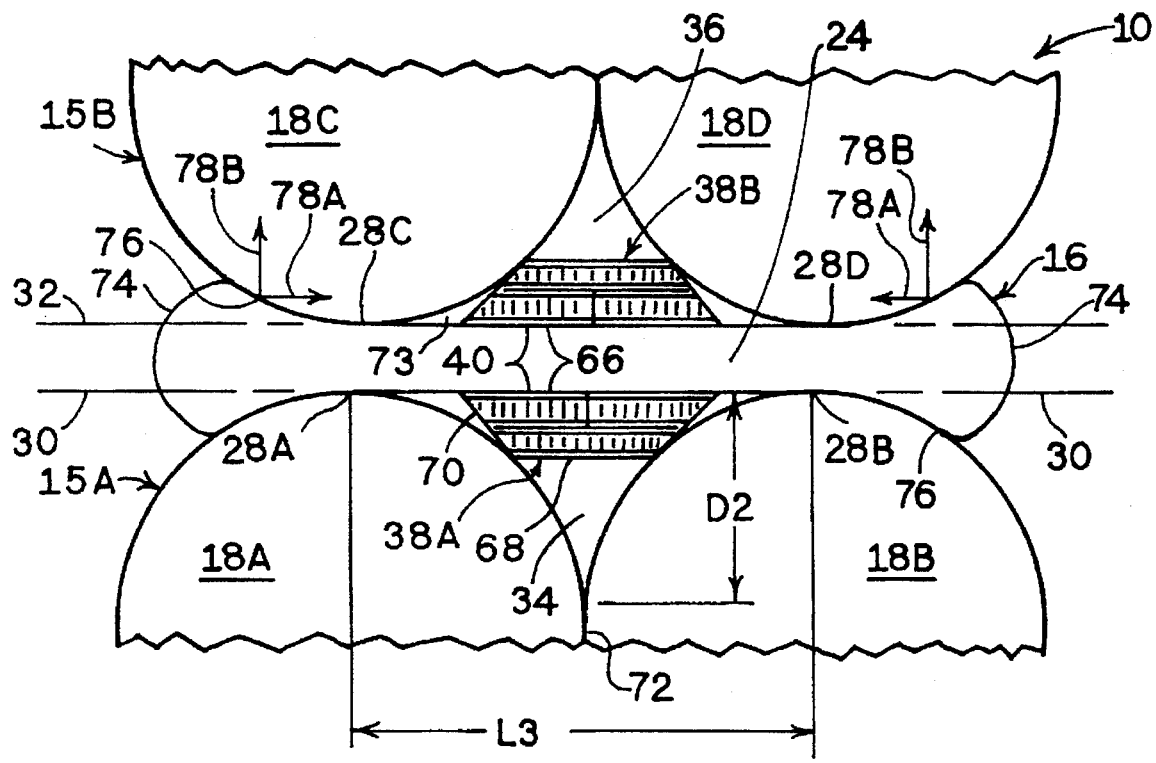
FIG. 8 is an enlarged view of a central portion of FIG. 3, showing in more detail the cooperation of the elements in a first embodiment of the bracing system of the invention.
Figure 9:
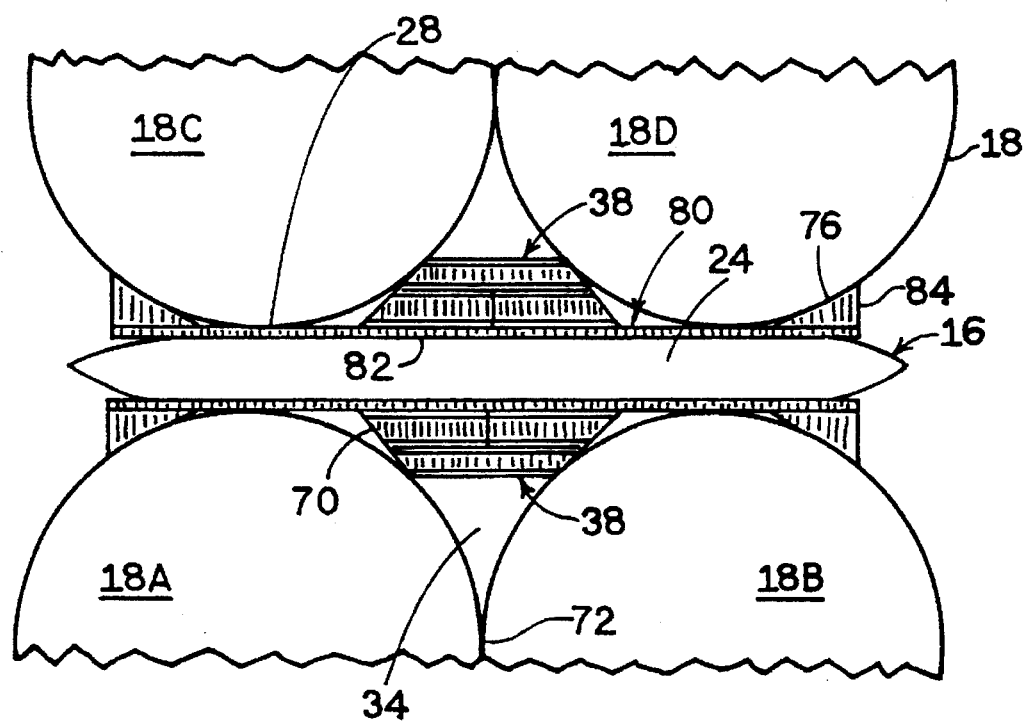
FIG. 9 is an enlarged view of a central portion of FIG. 4, showing in more detail the cooperation of the elements in a second embodiment of the bracing system of the invention.

Referring now to FIGS. 8 and 9, a wedge 38 is placed into cavity 34. The wedge as formed is sized such that, with the rolls 18A and 18B in contact with each other at side contact locus 72 along the respective upstanding walls of the rolls, and wherein the wedge is being placed in the cavity, a portion of each edge surface 70 of the wedge, generally extending along the entire length of the wedge, firmly engages the respective upstanding wall of the roll 18A or 18B at about the time the first outer surface 66 of the wedge coincides with the first imaginary plane 30.

The second outer surface 68 of the wedge, representing generally the thickness "T2" from the first outer surface 66, is disposed inwardly of the first outer surface, in the cavity a distance of at least about 22 percent of the depth "D2" of the cavity, but no more than about 50 percent of the depth "D2." If the thickness "T2" is less than about 22 percent of the depth "D2," the wedge tends to deform at its center, with the first outer surface moving inwardly into the cavity. If the thickness "T2" is greater than 50 percent of the depth "D2," the forces exerted by the wedge may overwhelm countervailing retaining forces holding the rolls e.g. 18A, 18B of the pair in contact with each other at side contact loci 72, thus separating the rolls of a given pair and defeating a primary purpose of the invention, that being to cause all the rolls in the car to coact together to routine shipping shocks.

To the extent the wedge 38 is pushed further into the cavity 34, the edge surfaces 70 are progressively crushed and deformed against, and thereby progressively engage the upstanding walls of the rolls 18A, 18B. In the process, the honeycomb wedge structure at the edge surfaces 70 is progressively permanently deformed in dynamic response to the forces operating between the wedge and the upstanding walls of the rolls. As a result, the generally planar edge surfaces 70 are reformed to correspond more closely with the curvature of the cylindrical upstanding walls of the rolls 18A, 18B where the edge surfaces so engage the walls, thereby increasing the contact surface area between the edge surfaces and the upstanding walls. With sufficient such deformation, the edge surfaces come into contact with the upstanding walls over substantially the entire thickness and length of the wedge. A corresponding wedge 38 is placed in cavity 36 according to the same principles as described for cavity 34.

With the wedges in place, air bag 16 is inserted in deflated condition and with its length in horizontal orientation, into the space 24 between the two imaginary planes 30, 32. As inserted, the air bag extends generally along the surfaces 40 defined by the loci of closest approach and the first outer surfaces 66 of the wedges 38. The air bag is then inflated to the typical pressure of e.g. about 8–10 psig, with the sides of the so-inflated bag engaged with the rolls at the loci of closest approach, and with the wedges at the first outer surfaces 66.

The air bags used in this invention are conventional air bags commonly used for rail shipping. Such air bags generally have 6–8 plies of extensible kraft linerboard, and an internal, air receiving, plastic bladder. In general, the plastic bladder holds inflation air, while the paper adds e.g. tensile strength, and limits elongation of the overall structure such that small areas of the bag surface cannot expand into small cavities or depressions in the object being protected. Rather, the bag will conform to the general outlines of the objects being shipped, and interface therewith at major surfaces and/or projections. Thus, the bag generally bridges across small breaks in the surface against which the inflated bag is disposed, such as the space 73 between wedge 38 and roll 18C at second imaginary plane 32. Bags of the nature above described are commercially available in a variety of lengths and widths from e.g. Shipping Systems Company, Crossett, Ark.

The finished structure of the bracing system 10, with both wedges in place, and with the bag inflated, is illustrated in FIG. 8. It is clear from the illustration of FIG. 8 that the thickness of the inflated bag along that portion "L3" of the bag which is between the loci of closest approach at respective rolls in a given pair (e.g. loci 28A and 28B) is relatively uniform. Namely, the spaces 73 along imaginary planes 30, 32 which are not occupied by either a locus 28 or the first outer surface 66 of a wedge, are sufficiently small that the conventional bag 16 bridges across those spaces of the cavity generally without penetrating into the cavity. This maintains the thickness of the bag as generally uniform along the length "L3."

The distance across the space 24, and thus, the thickness of the portion "L3" of the bag, should be maintained between a minimum of about 3 inches and a maximum of about 12 inches. Where the thickness of the bag, as inflated, is less than about 3 inches, the two opposing inner surfaces of the bag may inadvertently come into contact with each other during shipment, causing damage internal to the bag. Where the thickness is greater than about 12 inches, the bag becomes undesirably "fluid" and able to "flow" with especially forces directed across the width of the rail car. A thickness of about 3-6 inches is generally preferred. The distance across the space 24, and thus the thickness of the of the bag, can be adjusted as desired by placing conventional chocks and other conventional dunnage fillers between selected rolls in the array elements, in well known manner.

FIG. 8 further illustrates that the ends of the air bag expand against the rolls 18, at loci beyond the length "L3," such that enlarged ends 74 of the air bag contact the rolls at surface loci 76 generally outside the area defined by the length "L3." The so expanded ends of the air bag thus exert, on the upstanding walls of the rolls, forces directed toward the centers of the respective rolls, one vector 78A of such forces urging the respective rolls in a given pair toward each other as shown by the illustrative vectors 78A, 78B.

The overall effect of the combination of the wedge 38 and the expanded end 74, as held in place and urged against a given roll 18 by the inflated bag 16, is to hold the roll in a dynamically stressed condition wherein any movement of the roll is increasingly resisted by the element toward which the roll moves, namely by (i) the array 23 of rolls 18 behind it, (ii) the wedge 38 in the cavity, (iii) the enlarged end 74, or (iv) the constant thickness portion of the bag directly contacting the roll.

The inventor has discovered that the weak factor in Prior Art bracing systems, as illustrated in e.g. FIGS. 1 and 2, was the unsupported spans of the bag across the cavities 34, 36, which enabled localized expansion of the bag into the cavities. In such Prior Art bracing systems, when a roll moved, air in the bag would simply move from one expanded portion of the bag to another expanded portion, with limited resistance to movement of the roll except where the roll moved directly toward the main portion of the bag. Thus the bag had an unacceptable amount of fluidity that allowed the bag to "flow" with respect to movement of an adjacent roll, along with insufficient contact surface between the air bag and the rolls being supported.

By placing the wedges 38 in the cavities, and thereby preventing the bag from expanding into the cavities 34, 36, the bag in the bracing systems of the invention is less fluid, thus less able to "flow" with movement of a roll. In addition, the surface contact between the bag 16 and wedges 38 translates into greater effective surface contact between the bag and the rolls, as the affect of such surface contact is transferred, by the wedges, to the rolls. The elongated, constant-thickness portion "L3" of the bag between the two rolls in a pair effectively ties the two rolls together across the intervening wedge 38, such that movement by one roll may be resisted, through the bag, by the other roll in that pair.

One representation of the environment created by the invention is that the bag sees its contact with the combination of the two rolls of a pair and the respective wedge, as contact with a single element. Thus, the bag responds to the combination of the wedges and the contacted portions of the upstanding walls by resisting lateral movement of a roll with respect to the bag, as well as movements directly toward the bag.

Referring to FIGS. 2 and 3, a greater portion of the surface of the bag in FIG. 3 is in surface-to-surface contact with one of the rolls or one of the wedges at the Cavities than is the bag in Prior Art FIG. 2. Such increased surface contact increases the overall frictional resistance to relative movement of a roll with respect to the bag. The combination of the reduced fluidity of the bag, and increased surface friction between the bag, and the rolls and wedges, enhances the ability of the array 21, including rolls 18A-18H, the two wedges 38, and the bag 16, to function as a single unit, and reduces the ability of any one or more of rolls 18A-18D to act independently of the rest of the array 21.

Figure 10:
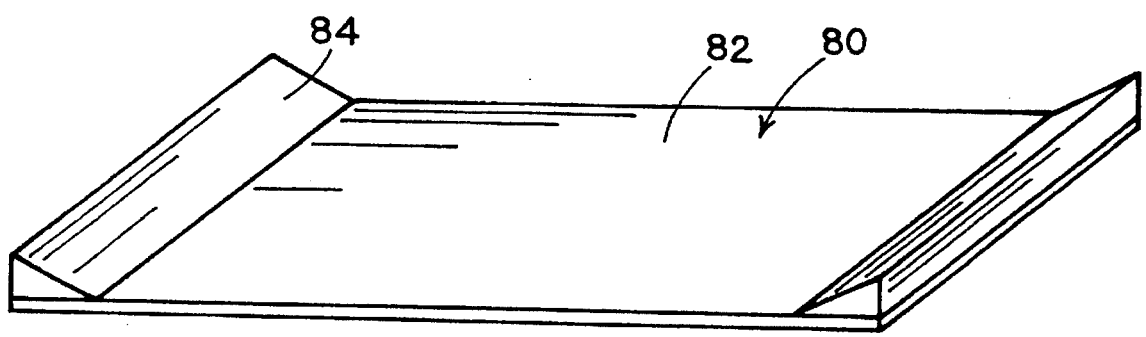
FIG. 10 shows a pictorial view of a contour buffer pad as used in the embodiment of e.g.

Referring to FIGS. 9 and 10, in a second embodiment of the invention, a contour buffer pad 80 includes a generally flat base member 82 having a length, a width, and a thickness. Shoulder pads 84 are secured to the base member at opposing ends of the base member. The shoulder pads, as illustrated, are elongated, and triangular in shape.

Referring to FIGS. 4 and 9, the contour buffer pad 80 is assembled into the bracing system as an interface between the bag 16 and the respective rolls 18 and wedge 38. Shoulder pads 84 embrace the rolls at loci 76, opposing the outwardly directed forces imposed by the urging of the respective wedge 38 into the cavity. Thus, the shoulder pads 84 serve generally the same function as the enlarged ends 74 of the bag in the embodiment of FIGS. 3 and 8. In addition, the base members 82 provide an actual continuous surface against which the bag 16 can expand and push. The use of the buffer pad thus obviates the last of the enlarged portions of the air bag, namely the enlarged ends 74 while providing embracing contact at loci 76 to balance the contact at the edge surfaces 70 of the respective wedges.

Whether with or without use of the intervening contour buffer pad, a wedge 38 receives force exerted by the air bag at its outer surface 66, and transfers the force to respective ones of the rolls 18A-18D through the edge surfaces 70.

EXAMPLES

Wedges were made as illustrated in FIGS. 5-7. The honeycomb medium was 33 pound linerboard, formed into cells wherein dimension "D1" was 0.75 inch, to form the core layer 56, 3 inches thick. The adhesive lines used within the honeycomb structure were 0.125 to 0.188 inch wide. The outer layers 58, 60 were 42 pound linerboard, adhesively bonded to the honeycomb core layer. The formed wedge, after folding as in FIG. 7, had maximum dimensions of length "L2" at 32 inches, width "W2" at 25 inches, and thickness "T2" at 6 inches. The wedges had dry compression strength of about 3450 pounds per square foot.

Example 1. The wedges so made were used in loading a rail car with 26 paper rolls each roll being 45 inches in diameter and about 85 inches wide (thus 85 inches high when loaded in the rail car) in a modified 1-2-2 pattern. A 3-inch honeycomb void filler was installed between each doorpost roll 18E-18H and the side wall. The doorway arrangement consisted of two pairs of two rolls, each pair loaded on the center line of the car. The above honeycomb wedges were installed in the cavities 34, 36 to substantially the full height of the 85 inch high upstanding walls of the rolls. The wedges provided a solid flat surface on each side of the air bag for preventing the air bag from filling the cavities, and interfaced with the respective rolls along substantially the entire lengths of the respective wedges. The space 24 between the two pairs of facing rolls 18A–18D was filled with two 36 inch by 84 inch air bags installed horizontally, one above the other, and inflated with air to 8 psig. The total load weighed approximately 160,000 pounds.

Comparative Example 2. A second rail car was loaded with 22 paper rolls, each 45 inches diameter and about 117 inches wide in a modified 1-2-2-1 loading pattern. The doorway arrangement consisted of two pairs of two rolls, each pair loaded on the center line of the car. The longitudinal void corresponding to space 24 between the two pairs of rolls was filled with two 60 inch by 108 inch air bags installed horizontally and inflated with air to 8 psig. The total load weighed approximately 200,000 pounds. No wedges were used.

Each car was subjected to four impact tests, three at the "A" end of the car, followed by one at the "B" end. For each car, the first impact was at about 4 mph. Each of the second, third, and fourth impacts were at about 6 mph.

After the testing, the air pressure in each bag was measured. In bags of Example 1, the air pressure was 7.2 psig. In bags of Comparative Example 2, the air pressure had dropped to 3.5 psi.

As illustrated by the above examples, the bracing system of the invention contemplates reducing the length, and potentially the width, of the bag such that the length of the bag is less than the combined diameters of the rolls in a given pair e.g. 18A and 18B whereas standard practice in prior art bracing systems requires that the length of horizontally placed bags be greater than the combined diameters of the rolls. Thus, bracing systems of the invention can use shorter bags relative to the sizes of the rolls.

While it is not necessary for the entirety of the edge surfaces 70 to engage the rolls, the greater the area of surface contact, the greater the level of control that can be exerted through the edge surface without damaging the roll. Accordingly, it is preferred that each edge surface 70 contact the respective roll along at least a major portion of the length of the wedge. Similarly, the wedges generally interface with the upstanding walls of the rolls over at least 50% of the combined height of the upstanding walls, preferably over at least 75% of the combined height. In general, the invention comprehends that the height of the wedges in the cavities typically corresponds with the combined height of the upstanding walls of the rolls of product.

The primary savings advantage of bracing systems of the invention is that the higher retained bag pressure, in combination with the better control of roll movement, reduces the relative amount of damage sustained by rolls shipped using the invention.

The wedges of the invention can be made of a variety of materials. For example, in some embodiments, the wedge is made of a single, trapezoidally-shaped block of material, such as a plastic foam. Resiliently compressible foamed plastics are preferred. An exemplary preferred foam for use in shipping large rolls of paper is, for example, polypropylene foam, about 1.9 to about 4.0 pounds per cubic foot (pcf) density, with a preferred density of about 2.5 to about 3.0 pcf.

A polypropylene foam of 2.8 pcf has, for example, crush resistance of about 43 at 25% compression, 59 at 50% compression, and 120 at 75% compression, all as measured according to ASTM D-3575. Compressive Set, also according to ASTM D-3575, is about 8%.

In resilient such embodiments, the edge surfaces crush and deform resiliently as the wedge is urged into the cavity beyond the point of initial contact. The first outer surface 66 of such foam wedges may also be deflected somewhat into the cavity by forces imposed by the air bag. However, the amount of such deflection is generally small compared to the overall depth of the cavity.

By virtue of the properties inherent in such resiliently compressible foams, the edge surfaces, and the thickness between the first and second outer surface thus return to approximately their original configurations when the forces are removed, allowing for normal Compression Set. Such foam wedges can be reused as desired after the used wedge returns to, or close to, its original trapezoidal shape. Accordingly, foam wedges as contemplated here can be reused a number times.

Whatever material is selected for construction of the wedge 38, the crush resistance of the wedge can be specified to provide the desired stress/strain ratio which will best protect the objects to be transported. Once the stress/strain ratio is specified, the material from which the wedge is to be manufactured can then be engineered to provide the specified stress/strain ratio. For example, the crush resistance of foam generally increases and decreases with corresponding increase and decrease of the foam density. Crush resistance of honeycomb paper structures as illustrated in FIG. 11 tend to increase and decrease with the weight of the paper used especially in the core layer, and to increase and decrease with the amount of adhesive used in bonding the cells to each other. Other materials and structures can be used by employing their known properties related to crush resistance.

While the above description has disclosed the use of honeycomb paper and foamed plastic as materials for making the wedges and contour buffer pads, other materials are acceptable so long as they provide the desired protection for the product to be shipped.

The wedge does need to be thick enough to resist excessive deflective bending at e.g. the center of the outer surface of the wedge such that the wedge, in combination with the respective loci of closest approach, present a generally unitary surface, to receive and resist the forces imposed by the side of the air bag without providing a cavity into which the air bag can expand.

If desired, the air bag, or bags, may be secured as by adhesive to a contour buffer pad or wedge before the dunnage material is assembled into the load.

Those skilled in the art will now see that certain modifications can be made to the invention herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A bracing system for bracing and cushioning the impact of a plurality of movable massive objects in a transport vehicle, the movable massive objects being arranged such that first and second units of the movable massive objects, comprising a first pair, are in proximate but spaced facing relationship to third and fourth units of such movable massive objects, comprising a second pair, the first and second units being disposed against and in contact with each other at first loci of contact along first and second upstanding walls thereof, the third and fourth units being disposed against and in contact with each other at second loci of contact along third and fourth upstanding walls thereof, the first, second, third, and fourth upstanding walls being generally cylindrical and having respective first, second, third, and fourth heights, the first and second units being spaced from and proximate the third and fourth units, a first imaginary plane defined by the combination of the first and second units at third loci of closest approach to the third and fourth units being substantially parallel to a second imaginary plane defined by the combination of the third and fourth units at fourth loci of closest approach to the first and second units, a first cavity, having a first depth defined between the first and second units and the first imaginary plane, a second cavity having a second depth defined between the third and fourth units and the second imaginary plane, said bracing system comprising:

(a) a first wedge means in the first cavity, said first wedge means having a first length comprising at least 50 percent of the smallest one of the first and second heights, a first width, first and second opposing outer surfaces and a first thickness therebetween, first and second edge surfaces extending along the first length and disposed across the first width from each other, the first outer surface being disposed proximate the first imaginary plane, the second opposing outer surface being disposed inwardly in the first cavity from the first outer surface, said first and second edge surfaces engaging respective ones of the first and second units along major portions of the first length of said first wedge means;

(b) a second wedge means in the second cavity, said second wedge means having a second length comprising at least 50 percent of the smallest one of the third and fourth heights, a second width, third and fourth opposing outer surfaces and a second thickness therebetween, third and fourth edge surfaces extending along the second length and disposed across the second width from each other, the third outer surface being disposed proximate the second imaginary plane, the fourth opposing outer surface being disposed inwardly in the second cavity from the third outer surface, said third and fourth edge surfaces engaging respective ones of the third and fourth units along major portions of the second length of said second wedge means; and (c) an inflatable member for being inflated and thereby having outer surfaces thereof disposed along the first and second imaginary planes between the third and fourth loci of closest approach, urging the first pair of units and said first wedge means, in combination, away from the second pair of units and said second wedge means, in combination.

2. A bracing system as in claim 1, said bracing system comprising first and second contact shoulders, connected to each other by a connector, thereby to maintain a predetermined distance therebetween, said contact shoulders contacting the first and second units outwardly of the third and fourth loci of closest approach, and urging the first and second units toward each other.

3. A bracing system as in claim 2, said first and second contact shoulders comprising expanded end portions of said inflatable member expanded against respective portions of the respective upstanding walls.

4. A bracing system as in claim 3, said inflatable member having a generally uniform inflated thickness between the third and fourth loci of closest approach.

5. A bracing system as in claim 4, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

6. A bracing system as in claim 2, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

7. A bracing system as in claim 1, said inflatable member being in surface-to-surface contact with said first and second wedge means along the first and second imaginary planes, and exerting the force of a compressed gas inside said inflatable means, urging the first and second units away from the third and fourth units.

8. A bracing system as in claim 7, said bracing system comprising first and second contact shoulders, comprising expanded and portions of said inflatable member expanded against respective portions of the respective upstanding walls, said expanded end portions contacting the first and second units outwardly of the third and fourth loci of closest approach, and urging the first and second units toward each other.

9. A bracing system as in claim 8, said inflatable member having a generally uniform inflated thickness between the third and fourth loci of closest approach.

10. A bracing system as in claim 7, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

11. A bracing system as in claim 1 wherein said first and second edge surfaces engage respective ones of the first and second units along substantially the entirety of the first length of said first wedge means, and wherein said third and fourth edge surfaces engage respective ones of the third and fourth units along substantially the entirety of the second length of said second wedge means.

12. A bracing system as in claim 11, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

13. A bracing system as in claim 1, said second outer surface being disposed inwardly in the first cavity from said first outer surface a distance between about 22 percent and about 50 percent of the first depth.

14. A bracing system as in claim 13, the fourth outer surface being disposed inwardly in the second cavity from the third outer surface a distance between about 22 percent and about 50 percent of the second depth.

15. A bracing system as in claim 1, said first and second edge surfaces on said first wedge means, and said third and fourth edge surfaces on said second wedge means, being generally planar, and being adapted to progressively crush and deform against, and thereby to progressively engage, the upstanding walls of the respective first, second, third, and fourth units as forces are applied between the respective said edge surfaces and the respective upstanding walls, whereby the respective said edge surfaces are progressively deformed in dynamically responsive contact with the upstanding walls as forces are applied between said wedge means and the respective units.

16. A bracing system as in claim 15, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

17. A bracing system as in claim 1, said inflatable member having a length exceeding the distance between the third and fourth loci of closest approach, said inflatable member having a first expanded end portion disposed against respective portions of the first and third upstanding walls at fifth and sixth loci disposed outwardly of the third and fourth loci of closest approach at the first and third units, and a second expanded end portion disposed against respective portions of the second and fourth upstanding walls at seventh and eighth loci disposed outwardly of the third and fourth loci of closest approach at the second and fourth units, said first and second expanded end portions, in combination, urging the first and second units, and the third and fourth units, respectively, toward each other.

18. A bracing system as in claim 17, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

19. A bracing system as in claim 1, each said wedge means comprising a cushioning dunnage wedge having a length, a width, opposing first and second outer surfaces extending along the length and width, a thickness between the first and second outer surfaces, and opposing edge surfaces corresponding with said edge surfaces of the respective said wedge means, each said cushioning dunnage wedge comprising a first cushioning central panel extending along the length and the width, and second and third cushioning wing panels depending from said first cushioning panel at said edge surfaces, said wing panels extending from the respective said edge surfaces and being disposed against said first cushioning central panel, each of said first and second edge surfaces being comprised of a respective edge of said first central panel and an edge of a respective said wing panel.

20. A bracing system as in claim 19, each of said central panel and said wing panels comprising first and second outer layers, and a core layer between said first and second outer layers, said first and second outer layers comprising about 33 to about 48 pounds per 1000 square foot ream paper, and said core layer comprising a paper medium configured as a honeycomb construction having cells about 0.38 to about 1.0 inch across, wherein the cells extend generally between said first and second outer layers, and the paper medium is about 25 to about 38 pounds per 1000 square foot ream.

21. A bracing system as in claim 20, said edge surfaces being adapted to progressively crush and deform against, and thereby to progressively engage, the upstanding walls of the respective units as forces are applied between the respective said edge surfaces and the respective upstanding walls whereby the respective said edge surfaces are progressively deformed in dynamically responsive contact with the upstanding walls as forces are applied between said wedge means and the respective units.

22. A bracing system as in claim 1, including at least one contour buffer pad disposed between said inflatable member and respective at least one of said first and second pairs of units and the respective said wedge means, said contour buffer pad comprising a base member extending along the respective one of the first and second imaginary planes between respective units in the respective pair of units and outwardly of the third and fourth loci of closest approach, and first and second shoulder pads mounted on said base member and contacting the respective units outwardly of the third and fourth loci of closest approach, the inflatable member urging the contour buffer pad toward the respective units whereby the first and second shoulder pads press against the respective units and urge the respective units toward each other.

23. A bracing system as in claim 11, said first and third outer surfaces of said wedge means extending generally along the respective first and second imaginary planes between the third and fourth loci of closest approach, thus presenting generally planar surface means to receive said inflatable member proximate the first and second imaginary planes, thereby to transfer forces from said inflatable member to the respective units through said first and second wedge means and respective said edge surfaces.

24. A bracing system for bracing and cushioning the impact of a plurality of movable massive objects arranged in a pattern in a transport vehicle, the pattern being configured such that first and second units of such movable massive objects, comprising a first pair, are arranged in proximate but spaced facing relationship to third and fourth units of such movable massive objects, comprising a second pair, the first and second units being disposed against, and in contact with, each other at a first locus of contact along respective first and second upstanding walls thereof, the third and fourth units being disposed against, and in contact with, each other at a second locus of contact along respective third and fourth upstanding walls thereof, a first imaginary plane, defined by the combination of the first and second units at third loci of closest approach to the third and fourth units, being substantially parallel to a second imaginary plane, defined by the combination of the third and fourth units at fourth loci of closest approach to the first and second units, a first cavity defined between the first and second units and the first imaginary plane and having a first depth, a second cavity defined between the third and fourth units and the second imaginary plane and having a second depth, said bracing system comprising:

(a) a first wedge means in the first cavity;
(b) a second wedge means in the second cavity; and
(c) an inflatable member having first and second sides, said inflatable member extending across and between the third and fourth loci of closest approach and urging said first wedge means inwardly of the first cavity, and urging said second wedge means inwardly of the second cavity, the inflatable member having a generally uniform thickness between the third and fourth loci of closest approach, and thereby urging the first and second units and said first wedge means, in combination, away from the third and fourth units and said second wedge means, in combination.

25. A bracing system as in claim 24, each of said first and second wedge means having a length comprising at least 50 percent of the smallest one of the heights of the respective units, a width, first and second opposing outer surfaces and a thickness therebetween, first and second edge surfaces extending along the length and disposed across the width from each other, the first outer surface being disposed proximate the respective imaginary plane, the second opposing outer surface being disposed inwardly in the respective cavity from the first outer surface, the first and second edge surfaces engaging respective ones of the units along major portions of the lengths of the respective wedge means.

26. A bracing system as in claim 25, said edge surfaces on said first and second wedge means being generally planed, and being adapted to progressively crush and deform against, and thereby to progressively engage the upstanding walls of the respective units as forces are applied between the respective said edge surfaces and the respective upstanding walls, whereby the respective said edge surfaces are progressively deformed in dynamically responsive contact with the upstanding walls as forces are applied between the respective said wedge means and the respective units.

27. A bracing system as in claim 26, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

28. A bracing system as in claim 25 wherein said first and second edge surfaces on each of said first and second wedge means engage respective ones of the units along substantially the entirety of the respective lengths of said first and second wedge means.

29. A bracing system as in claim 24, said bracing system comprising first and second contact shoulders, connected to each other by a connector, thereby to maintain a predetermined distance therebetween, said contact shoulders contacting the first and second units outwardly of the third and fourth loci of closest approach, and urging the first and second units toward each other.

30. A bracing system as in claim 29, said first and second contact shoulders comprising expanded end portions of said inflatable member expanded against respective portions of the respective upstanding walls.

31. A bracing system as in claim 30, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

32. A bracing system as in claim 29, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

33. A bracing system as in claim 24, each said wedge means comprising a cushioning dunnage wedge having a length, a width, opposing first and second outer surfaces extending along the length and width, first and second outer surfaces and a thickness therebetween, and opposing edge surfaces extending along the length and across the width from each other, each said cushioning dunnage wedge comprising a first cushioning central panel extending along the length and the width, and second and third cushioning wing panels depending from said first cushioning panel at said edge surfaces and being disposed against said central panel, said wing panels extending from the respective said edge surfaces onto said first cushioning central panel, each of said first and second edge surfaces being comprised of a respective edge of said first central panel and an edge of a respective said wing panel.

34. A bracing system as in claim 33, each of said central panel and said wing panels comprising first and second outer layers, and a core layer between said first and second outer layers, said first and second outer layers comprising about 33 to about 48 pounds per 1000 square foot ream paper, and said core layer comprising a paper medium configured as a honeycomb construction having cells about 0.38 to about 1.0 inch across, wherein the cells extend generally between said first and second outer layers, and the paper medium is about 25 to about 38 pounds per 1000 square foot ream.

35. A bracing system as in claim 34, said edge surfaces being generally planar, and being adapted to progressively crush and deform against, and thereby to progressively engage the upstanding walls of, the respective units as forces are applied between the respective said edge surfaces and the respective upstanding walls, whereby the respective said edge surfaces are progressively deformed in dynamically responsive contact with the upstanding walls as forces are applied between the respective said wedge means and the respective units.

36. A bracing system as in claim 24 said inflatable member having a length extending outwardly of the third and fourth loci of closest approach, first and second expanded end portions of said inflatable member extending toward, and engaging, respective ones of the first, second, third, and fourth upstanding walls outwardly of the third and fourth loci of closest approach, and thereby urging the first and second units, and the third and fourth units, respectively, toward each other.

37. A bracing system as in claim 36, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

38. A bracing system as in claim 24, said first and second pairs of units of movable massive objects being disposed at a door in the transport vehicle, the first and second pairs being included in respective first and second arrays of the movable massive objects defined between the first and second pairs and respective opposing walls of the transport vehicle, that portion of each array disposed between the respective pair of units and respective walls transferring, from the respective walls of the transport vehicle to the respective pair of units, impact forces imposed on the respective walls by movements of the transport vehicle, said bracing system being configured and adapted to transfer the impact forces between the first and second arrays while maintaining a relatively uniform thickness of said inflatable member between the first and second pairs along a path extending between first ones of the third and fourth loci of closest approach and second ones of the third and fourth loci of closest approach.

39. A bracing system as in claim 38, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

40. A bracing system as in claim 24, including at least one contour buffer pad between said inflatable member and respective at least one of said first and second pairs of units and the respective said wedge means, said contour buffer pad comprising a base member extending along the respective one of the first and second imaginary planes and between respective units in the respective pair of units outwardly of the third and fourth loci of closest approach, and first and second shoulder pads mounted on said base member and contacting the respective units outwardly of the third and fourth loci of closest approach, the inflatable member urging the contour buffer pad toward the respective units whereby the first and second shoulder pads press against the respective units and urge the respective units toward each other.

41. A bracing system as in claim 24, said second outer surface on the respective said wedge means being disposed inwardly in each said cavity, from the first outer surface, a distance between about 22 percent and about 50 percent of the respective depth of the respective cavity.

42. A bracing system as in claim 24, each of said first and second wedge means having a length, a width, first and second opposing outer surfaces, first and second edge surfaces extending along the length and disposed across the width from each other, said first outer surfaces extending generally along the respective first and second imaginary planes between the third and fourth loci of closest approach, thus presenting first and second generally planar surface means, along the first and second imaginary planes, to receive said inflatable member proximate the first and second imaginary planes, thereby to transfer force from said inflatable member to the respective units through the first and second wedge means and respective said edge surfaces.

* * * * *